No. 617,814. Patented Jan. 17, 1899.
J. W. POPE.
PEANUT GATHERER.
(Application filed Sept. 4, 1897.)
(No Model.) 4 Sheets—Sheet 1.

WITNESSES:
Edwin L. Bradford
Victor J. Evans.

INVENTOR
Joseph W. Pope.
BY
John Wedderburn
ATTORNEY.

No. 617,814. Patented Jan. 17, 1899.
J. W. POPE.
PEANUT GATHERER.
(Application filed Sept. 4, 1897.)
(No Model.) 4 Sheets—Sheet 2.

WITNESSES:
Edwin L Bradford
Victor J. Evans

INVENTOR
Joseph W. Pope
BY
John Wedderburn.
ATTORNEY.

No. 617,814. Patented Jan. 17, 1899.
J. W. POPE.
PEANUT GATHERER.
(Application filed Sept. 4, 1897.)

(No Model.) 4 Sheets—Sheet 4.

WITNESSES:
Edwin L. Bradford
Victor J. Evans

INVENTOR
Joseph W. Pope.
BY
John Wedderburn
ATTORNEY.

United States Patent Office.

JOSEPH WILLIAM POPE, OF POPE, VIRGINIA.

PEANUT-GATHERER.

SPECIFICATION forming part of Letters Patent No. 617,814, dated January 17, 1899.

Application filed September 4, 1897. Serial No. 650,690. (No model.)

*To all whom it may concern:*

Be it known that I, JOSEPH WILLIAM POPE, of Pope, in the county of Southampton and State of Virginia, have invented certain new and useful Improvements in Peanut-Gatherers; and I do hereby declare the following to be a full, clear, and exact description of the invention, such as will enable others skilled in the art to which it appertains to make and use the same.

This invention relates to improvements in peanut-gatherers.

The object of the present invention is to improve the construction of peanut-gatherers and to provide a simple and comparatively inexpensive machine adapted for gathering or harvesting peanuts and similar products of agriculture growing upon vines and capable of elevating the peanuts and of depositing them upon a table or platform and of thoroughly agitating them, so as to effect a separation of the peanuts and the vines.

A further object of the invention is to discharge the vines automatically from the machine and to enable the peanuts to be deposited periodically in piles upon the ground.

The invention consists in the construction and novel combination and arrangement of parts, as hereinafter fully described, illustrated in the accompanying drawings, and pointed out in the claims hereto appended.

Figure 1:
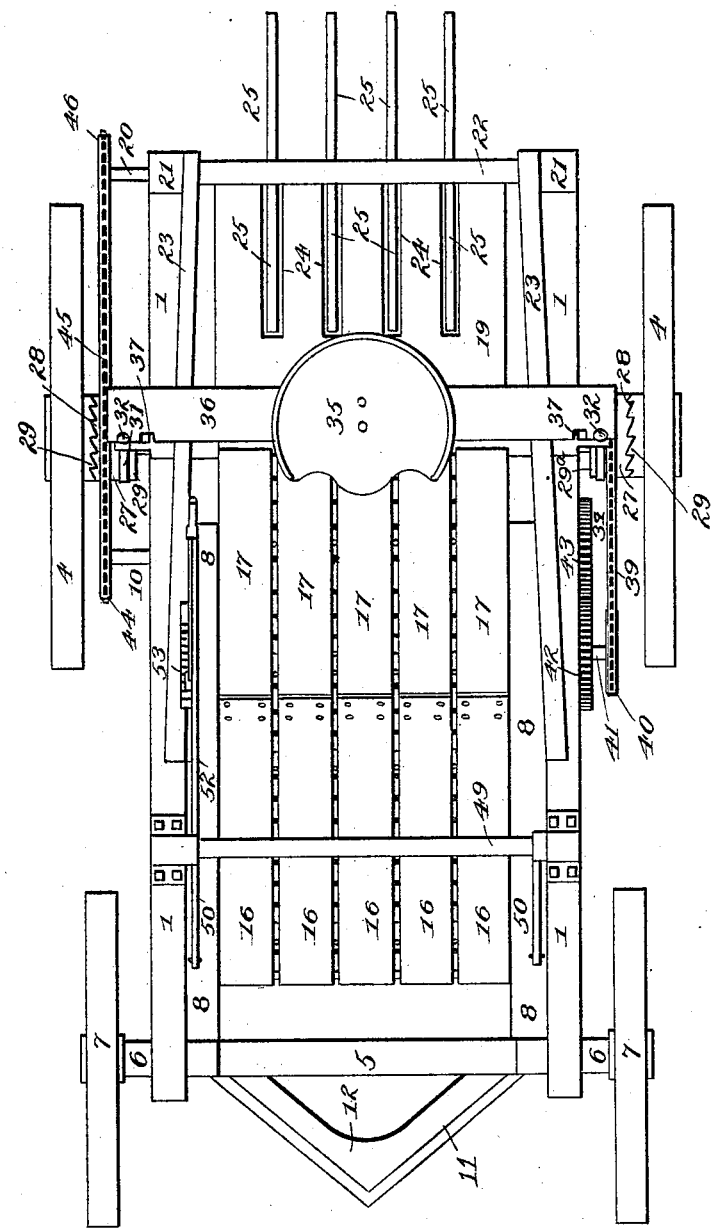
Figure 2:
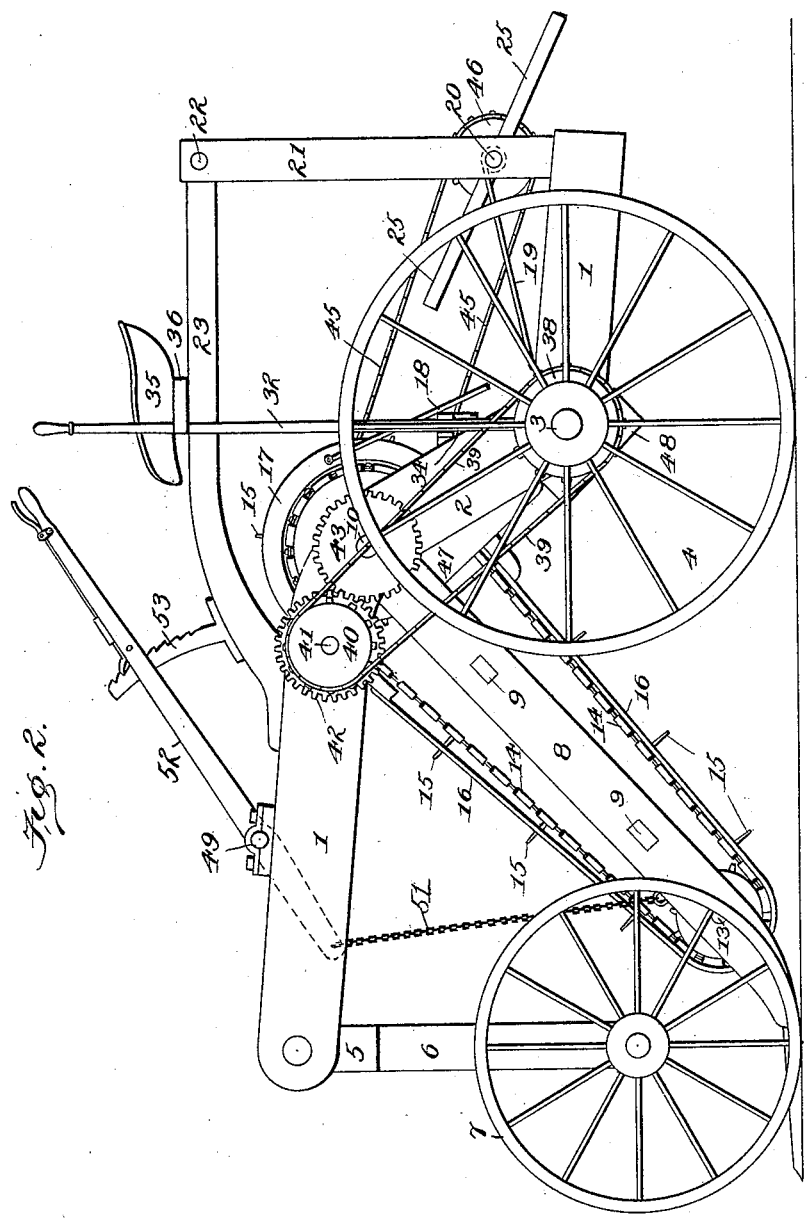
Figure 3:
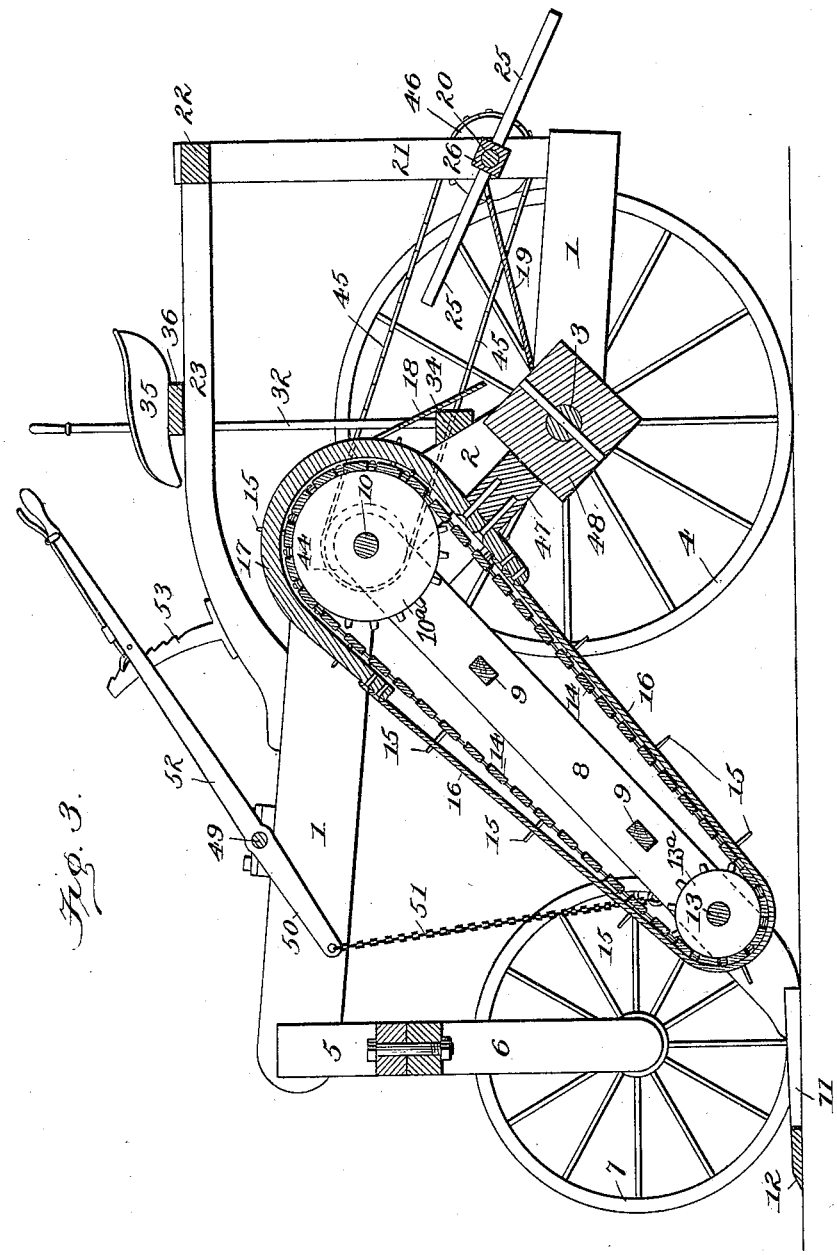
Figure 4:
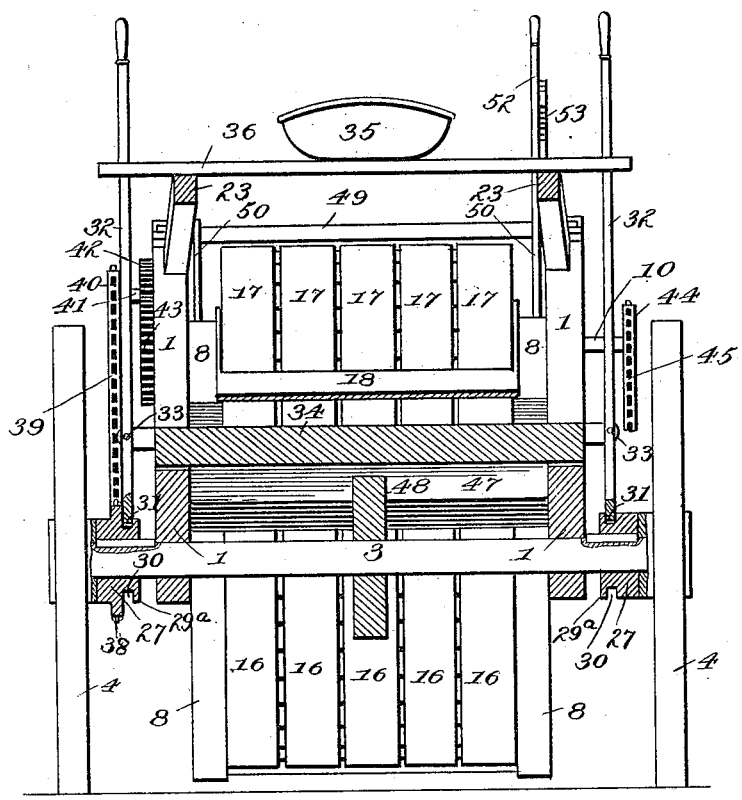

In the drawings, Figure 1 is a plan view of a machine constructed in accordance with this invention. Fig. 2 is a side elevation of the same. Fig. 3 is a longitudinal sectional view. Fig. 4 is a transverse sectional view taken at the main axle.

Like numerals of reference designate corresponding parts in all the figures of the drawings.

1 1 designate longitudinal side bars constituting a truck-frame and having their front and rear portions arranged at different elevations, the front portions being raised and connected with the lower or rear portions by inclined connecting portions 2. The truck-frame is mounted upon a main axle 3, passing through the side bars 1 in rear of the center of the truck at the angle formed by the lower rear portions of the bars and the inclined connecting portions. The ends of the main axle 3 have journaled on them carrying-wheels 4, which are loosely mounted on the spindles of the axle 3, outside of the bars 1.

The front ends of the bars 1 are connected by a transverse bolster 5, which rests upon an arched front axle or yoke 6, having front carrying-wheels 7, arranged on spindles.

The machine is designed to be drawn by one or more draft-animals, the draft attachment being suitably secured to the front axle or yoke 6.

The truck supports an oscillating excavating-frame 8, consisting of parallel side bars suitably connected and braced by transverse bars 9, and the said frame is pivotally mounted at its upper end upon a transverse shaft 10, passing through the side bars 1, adjacent to the upper angles thereof. The frame 8 extends downwardly and forwardly from the shaft 10, and the side bars of the frame 8 are connected at their lower or front ends by a V-shaped shoe 11, having a beveled or chamfered front edge and constituting a cutter or plow with rigid diverging cutting edges 12, adapted to dig up the peanuts as the machine moves forward. The lower end of the frame 8 is provided with bearings for a transverse shaft 13, and running around the shafts 10 and 13 is an endless slatted belt 14, suitable sprocket-wheels $10^a$ and $13^a$ being provided for supporting the belt, the intervals between the slats of the belt receiving the teeth of the sprocket-wheels. The endless belt is provided at intervals with fingers or prongs 15, mounted upon the slats and arranged to operate in spaces between a series of longitudinal guides or strips 16, forming a slotted inclined apron or table, along which the peanuts and vines are carried in an upward and rearward direction. The guides or strips 16 are preferably constructed of thin metal, leather, or other suitable flexible material for a greater portion of their length, and they are connected at their ends to rigid segments 17, of the same width as the strips 16, spaced apart to allow the fingers or pickers to pass between them and supported by means hereinafter described.

The peanuts and trash after passing over the top of the inclined apron or table are directed by a rearwardly-inclined apron 18 upon a pivotally-mounted table 19, and the said apron 18 is suspended from the segments 17. The slotted table 19 is mounted at its rear end upon a transverse shaft 20, journaled in vertical bars or arms 21, forming a part of an auxiliary frame superimposed upon the main frame. The upper ends of the arms or bars 21 are connected by a cross-bar 22, and extending forward from the bar 22 are curved side bars or arms 23, which are secured at their front ends to the upper portions of the longitudinal side bars 1 of the main frame.

The pivotally-mounted table, which extends downwardly and forwardly from the shaft 20, is provided at intervals with longitudinal slots 24, which are not wide enough to permit the peanuts to fall through them, but which permit of the passage of a series of agitators or beaters 25, secured to and projecting in diametrically opposite directions from a central hub 26, which is fast upon the said shaft 20. The agitators or beaters 25, which consist of arms or rods, strike the vines and separate the peanuts therefrom, and the former are thrown off the machine, while the latter are dumped in piles on the ground at intervals. The agitators or beaters, which move upward and outward from the slotted table 19, engage the vines as they fall from the endless carrier and they serve to shake the peanuts upon the table and throw the vines outward, thereby automatically removing the same from the machine.

The machine is provided at each side, in the space beween the wheels 4 and the longitudinal bars 1, with a sliding clutch 27, mounted to slide upon the axle 3 by means of a feather or spline, and provided at its outer face with teeth 28, adapted to interlock with corresponding teeth 29 on the inner face of the wheel 4 at the hub thereof. Each clutch is provided with a hub $29^a$, having an annular groove 30, receiving the forked end 31 of a shifting-lever 32, and the latter, which is fulcrumed between its ends at 33 on a cross-bar 34, is adapted to throw the clutch into and out of engagement with the wheel. The cross-bar 34, which connects the longitudinal bars 1, braces the main frame and is secured to the central inclined portions 2 of the said bars 1.

The superimposed frame is provided with a cross-bar 36, connecting the curved bars or arms 23 and supporting a seat for the accommodation of the driver. The ends of the bar 35 are provided with notches 37, arranged to receive the upper portions of the shifting-levers 32, whereby the said levers may be locked against movement to hold the sliding clutches in or out of engagement with the carrying-wheels 4.

One of the sliding clutches carries a sprocket-wheel 38, receiving a sprocket-chain 39, which extends to a sprocket-pinion 40, located in advance of the sprocket-wheel 38 and mounted upon a stub-shaft 41, projecting laterally from the adjacent longitudinal bar 1 of the main frame. A spur gear-wheel 42 is rigidly connected with the sprocket-pinion 40 and meshes with a similar gear-wheel 43, fast on the shaft 10, at one end thereof. On the other end of the shaft 10 and at the opposite side of the machine is a sprocket-wheel 44, fast on the said shaft 10 and connected by a sprocket-chain 45 with a sprocket-wheel 46, which is fast on the corresponding end of the shaft 20. By this arrangement of gearing the endless slatted belt or carrier and the rotary beaters are operated when the axle 3 is connected with and rotated by the carrying-wheels 4.

The oscillating frame 8, which carries a yoke 47, is positively oscillated when the machine is in operation by a four-sided cam 48, consisting of a rectangular block mounted fast on the main axle 3 and located at the center thereof. A yoke 47, which extends beneath the lower portions of the segments 17, forms a support for the same, whereby they are held rigid with the oscillating frame. The cam, which may be of any other desired configuration, strikes the yoke as the axle 3 is rotated and oscillates the frame 8, causing the same as it travels through the ground to loosen the soil and in a great measure separate the peanuts therefrom, so that comparatively little earth will be carried up the inclined apron 16. This oscillatory motion of the plow or cutter enables the peanuts and vines to be readily and quickly freed from the soil, so that they can be easily operated on by the endless carrier. The front portion of the oscillating frame is connected by chains 51 with crank-arms 50 of a transverse shaft 49, the lower ends of the chains being secured to the side bars of the frame 8. The shaft is controlled by an operating-lever 52, adapted for raising and lowering the oscillating frame to regulate the depth of the plow or cutter and also to lift the same clear of the ground when the machine is not in use. The lever 52 also enables the plow or cutter to be readily lifted over a stump or other obstruction to clear the same when the machine is in operation. The lever carries a suitable detent or pawl for engaging a segmental rack 53 at one side of the superimposed frame, thereby enabling the oscillating frame to be held at any desired adjustment.

It will be seen that the cutter or plow while digging the peanuts operates to loosen the soil and shake the same from them, and that as the entire frame 8 is oscillated comparatively little soil will be carried over the segments 17. It will also be seen that after the peanuts and vines fall upon the pivotally-mounted table they are thoroughly operated upon by the rotary beater, which separates the peanuts from the vines. At suitable intervals the peanuts may he dumped from the slotted table, and the operative parts of the machine may be thrown entirely out of gear by the shifting-levers. The carrying-wheels may be independently thrown out of gear with the main axle for facilitating turning the machine.

Changes in the form, proportion, and minor details of construction may be resorted to without departing from the spirit or sacrificing any of the advantages of this invention.

What I claim is—

1. A machine of the class described, provided with an automatically-oscillating plow adapted to agitate the soil to loosen the same and free the peanuts and vines therefrom, substantially as described.

2. In a machine of the class described, the combination with a carrying-truck, of a pivoted frame mounted thereon and provided with a suitable plow, and means for automatically oscillating the frame, whereby the plow is vibrated in the soil to loosen the latter and shake the same from the vines and peanuts in digging the latter, substantially as described.

3. In a machine of the class described, the combination with a truck, of an inclined pivoted frame provided with a suitable plow, an endless carrier mounted on the frame and provided with a series of picking and elevating fingers, gearing for operating the endless carrier, and means for automatically oscillating the pivoted frame, whereby the plow is vibrated in the ground to loosen the soil and shake the same from the peanuts and vines, substantially as described.

4. In a machine of the class described, the combination with a truck, of an inclined frame, provided with a suitable plow, a series of picking and elevating fingers mounted on the frame, a slotted table on which the peanuts are delivered, and beaters working through the slots of the table, substantially as described.

5. In a machine of the class described, the combination with a carrying-truck, of an inclined oscillating frame provided with a plow, an endless carrier mounted on the frame and having picking and elevating fingers, gearing for operating the endless carrier, and means connected with one of the axles for positively oscillating the frame whereby the plow is vibrated in the soil, substantially as described.

6. In a machine of the class described, the combination with a truck, of a pivoted frame having a plow, and a cam arranged to engage and positively oscillate the frame, whereby the plow is vibrated in the ground to loosen the soil and shake the same from the produce harvested, substantially as described.

7. In a machine of the class described, the combination with a truck, of a plow, picking and elevating mechanism, a table arranged in rear of the latter and provided with longitudinal slots, a transverse shaft, and beaters carried by the shaft and arranged to operate through the slots for engaging the contents of the table, substantially as described.

8. In a machine of the class described, the combination with a truck, of a pivoted frame mounted on the truck and provided with a plow, and a rectangular block mounted on the axle of the truck, forming a cam and engaging and positively oscillating the pivoted frame whereby the plow is vibrated in the ground to loosen the soil, substantially as described.

9. In a machine of the class described, the combination of a truck, a pivoted frame, an endless carrier mounted on the pivoted frame, a yoke secured to the pivoted frame and extending beneath the pivoted carrier, and a cam mounted on the axle-truck and arranged to engage the yoke, whereby the frame is positively oscillated, substantially as described.

10. In a machine of the class described, the combination of a truck, a pivoted frame, a yoke arranged at the bottom of the pivoted frame and connected with the sides thereof, an inclined apron consisting of a series of spaced strips 16 and rigid segments 17 secured to the yoke, an endless carrier having fingers operating through the spaces between the strips and the segments, and means for oscillating the pivoted frame, substantially as described.

In testimony whereof I have signed this specification in the presence of two subscribing witnesses.

JOSEPH WILLIAM $\overset{\text{his}}{\times}$ POPE.
mark

Witnesses:
E. L. MARKS,
J. M. WHITEHEAD.